United States Patent
Etchegoyen

(10) Patent No.: US 10,306,467 B2
(45) Date of Patent: May 28, 2019

(54) SHARED STATE AMONG MULTIPLE DEVICES

(71) Applicant: Uniloc Luxembourg S.A., Luxembourg (LU)

(72) Inventor: Craig S. Etchegoyen, Plano, TX (US)

(73) Assignee: Uniloc 2017 LLC, Wilmington, DE (US)

( * ) Notice: Subject to any disclaimer, the term of this patent is extended or adjusted under 35 U.S.C. 154(b) by 666 days.

(21) Appl. No.: 14/196,065

(22) Filed: Mar. 4, 2014

(65) Prior Publication Data

US 2014/0310404 A1    Oct. 16, 2014

Related U.S. Application Data

(60) Provisional application No. 61/811,065, filed on Apr. 11, 2013.

(51) Int. Cl.
*H04L 12/28* (2006.01)
*H04L 29/06* (2006.01)
*H04L 29/08* (2006.01)
*H04W 12/06* (2009.01)

(52) U.S. Cl.
CPC ......... *H04W 12/06* (2013.01); *H04L 12/2809* (2013.01); *H04L 12/2825* (2013.01); *H04L 63/10* (2013.01); *H04L 63/12* (2013.01); *H04L 67/02* (2013.01); *H04L 67/36* (2013.01)

(58) Field of Classification Search
CPC ...................................................... H04L 12/26
See application file for complete search history.

(56) References Cited

U.S. PATENT DOCUMENTS

| 6,023,586 | A | * | 2/2000 | Gaisford | G06F 8/60 |
| | | | | | 707/999.01 |
| 6,044,475 | A | * | 3/2000 | Chung | G06F 11/1438 |
| | | | | | 714/15 |
| 6,499,062 | B1 | * | 12/2002 | Shteyn | G06F 9/4443 |
| | | | | | 700/19 |

(Continued)

FOREIGN PATENT DOCUMENTS

WO    WO 2012/059961    5/2012

OTHER PUBLICATIONS

Jennifer Chappell; Treo Software Roundup; Aug. 6, 2007; Treo Central; 15 Pages.*

(Continued)

*Primary Examiner* — Scott B Christensen
(74) *Attorney, Agent, or Firm* — Sean D. Burdick

(57) ABSTRACT

Devices of an individual's device-sphere cooperate with a device-sphere manager to improve continuity of the user's experience using any of the devices. When a device's state changes, the device reports the change to the device-sphere manager. The device-sphere manager modifies the device image for the reporting device and informs other devices of the device-sphere that corresponding changes should be made in the other devices as well. Each device image includes application records representing applications installed in the subject device. The device image for each device also includes partition images of each of one or more partitions of persistent storage of the device. A data image for the device-sphere represents data shared among the constituent devices of the device-sphere.

15 Claims, 14 Drawing Sheets

(56) References Cited

U.S. PATENT DOCUMENTS

| | | | | |
|---|---|---|---|---|
| 6,633,314 | B1* | 10/2003 | Tuli | G06F 17/30899 |
| | | | | 348/E7.071 |
| 6,643,284 | B1* | 11/2003 | Inoue | H04W 88/04 |
| | | | | 370/310 |
| 6,763,376 | B1* | 7/2004 | Devine | G06F 11/0709 |
| | | | | 379/201.01 |
| 7,350,149 | B1* | 3/2008 | Franceschelli, Jr. | |
| | | | | G06F 9/4443 |
| | | | | 709/203 |
| 7,526,559 | B1* | 4/2009 | Phillips | H04L 67/14 |
| | | | | 709/203 |
| 7,676,583 | B2* | 3/2010 | Eaton | G06Q 30/08 |
| | | | | 709/227 |
| 8,234,380 | B1* | 7/2012 | Tetreault | H04L 67/1097 |
| | | | | 709/208 |
| 8,260,879 | B2* | 9/2012 | Chan | G06F 9/4856 |
| | | | | 709/217 |
| 8,302,152 | B1* | 10/2012 | Hewinson | H04L 63/10 |
| | | | | 455/410 |
| 8,527,504 | B1 | 9/2013 | Krishnamurthy | |
| 8,806,489 | B2* | 8/2014 | Freimuth | G06F 8/63 |
| | | | | 709/223 |
| 2001/0042073 | A1* | 11/2001 | Saether | G06F 17/30194 |
| 2001/0047441 | A1* | 11/2001 | Robertson | G06F 13/385 |
| | | | | 710/65 |
| 2002/0077114 | A1* | 6/2002 | Isham | H04L 67/36 |
| | | | | 455/454 |
| 2003/0018719 | A1* | 1/2003 | Ruths | G06F 9/52 |
| | | | | 709/205 |
| 2003/0037341 | A1* | 2/2003 | Van Der Meulen | G08C 17/02 |
| | | | | 725/143 |
| 2003/0110272 | A1 | 6/2003 | du Castel et al. | |
| 2003/0231212 | A1* | 12/2003 | Slemmer | H04L 12/2803 |
| | | | | 715/771 |
| 2005/0105132 | A1* | 5/2005 | Hagiuda | H04L 67/025 |
| | | | | 358/1.15 |
| 2006/0013197 | A1* | 1/2006 | Anderson | H04L 63/08 |
| | | | | 370/352 |
| 2006/0149818 | A1 | 7/2006 | Odell et al. | |
| 2006/0185005 | A1 | 8/2006 | Graves et al. | |
| 2006/0294351 | A1* | 12/2006 | Rostampour | G06F 9/4862 |
| | | | | 713/1 |
| 2007/0054627 | A1* | 3/2007 | Wormald | G06F 9/4856 |
| | | | | 455/70 |
| 2007/0094323 | A1* | 4/2007 | Smith | H04L 12/66 |
| | | | | 709/202 |
| 2007/0105542 | A1* | 5/2007 | Friedman | H04W 4/00 |
| | | | | 455/420 |
| 2007/0128899 | A1* | 6/2007 | Mayer | G06F 9/4406 |
| | | | | 439/152 |
| 2007/0171921 | A1* | 7/2007 | Wookey | G06F 3/1415 |
| | | | | 370/401 |
| 2007/0198744 | A1* | 8/2007 | Wensley | H04L 12/1827 |
| | | | | 709/248 |
| 2007/0276916 | A1* | 11/2007 | McLoughlin | G06F 8/63 |
| | | | | 709/208 |
| 2008/0183645 | A1 | 7/2008 | Burger et al. | |
| 2008/0205507 | A1 | 8/2008 | Komiya et al. | |
| 2008/0270582 | A1* | 10/2008 | Jensen | H04L 12/2809 |
| | | | | 709/220 |
| 2009/0204966 | A1* | 8/2009 | Johnson | G06F 9/4856 |
| | | | | 718/100 |
| 2009/0259747 | A1* | 10/2009 | Sagefalk | H04N 5/23206 |
| | | | | 709/224 |
| 2010/0031325 | A1* | 2/2010 | Maigne | G06F 9/45533 |
| | | | | 726/4 |
| 2010/0040072 | A1* | 2/2010 | Kitada | H04L 45/02 |
| | | | | 370/400 |
| 2010/0042233 | A1* | 2/2010 | Han | H04L 12/2809 |
| | | | | 700/90 |
| 2010/0107205 | A1* | 4/2010 | Foti | H04L 65/4084 |
| | | | | 725/109 |
| 2011/0055627 | A1 | 3/2011 | Zawacki et al. | |
| 2011/0125866 | A1 | 5/2011 | Williams | |
| 2011/0131520 | A1* | 6/2011 | Al-Shaykh | H04L 12/2807 |
| | | | | 715/772 |
| 2011/0179477 | A1* | 7/2011 | Starnes | G06F 21/52 |
| | | | | 726/9 |
| 2011/0213855 | A1* | 9/2011 | King | G06F 3/0481 |
| | | | | 709/217 |
| 2012/0102564 | A1* | 4/2012 | Schentrup | G06F 21/6218 |
| | | | | 726/16 |
| 2012/0198225 | A1* | 8/2012 | Gadouche | G06F 21/86 |
| | | | | 713/2 |
| 2013/0244614 | A1 | 9/2013 | Santamaria et al. | |
| 2014/0068452 | A1 | 3/2014 | Joseph et al. | |
| 2014/0372553 | A1* | 12/2014 | Blackburn | H04L 67/10 |
| | | | | 709/217 |

OTHER PUBLICATIONS

Arkko, J., et al., Using IPsec to Protect Mobile IPv6 Signaling Between Mobile Nodes and Home Agents, http://tools.ietf.org/rfc/rfc3776.txt, Jun. 2004, pp. 1-36.

* cited by examiner

SHARED STATE AMONG MULTIPLE DEVICES

This application claims priority to U.S. Provisional Application 61/811,065, filed Apr. 11, 2013, which is fully incorporated herein by reference.

BACKGROUND OF THE INVENTION

1. Field of the Invention

The present invention relates generally to computer network and, more particularly, methods of and systems for improving continuity of a user's experience across multiple devices.

2. Description of the Related Art

Not too many years ago, an individual might use only one or two computing devices—perhaps one at work and perhaps one at home. Today, individuals use a wide variety of computing devices. For example, it's not at all uncommon for an individual to have one or more computers at work, one or more at home (perhaps a desktop computer and a laptop computer), a smart phone (which includes a pocket-sized, fully functional computer), digital cameras (still and video), and perhaps one or more tablet computers. In addition, many household appliances in use today also incorporate fully functional computers. Such appliances include televisions, set-top boxes, personal video recorders (PVRs), digital media players, and networked music players.

The multitude of devices used by an individual can be thought as the individual's device-sphere. One of the challenges associated with an individual's device-sphere is that the device-sphere is hardly seamless. An individual may which to view a video captured in a video camera on a television. Such typically requires a cabled connection between the two and separate control of each, despite the fact that both are fully capable of communication with one another through a computer network. Similar examples include wanting to watch a movie purchased and downloaded through a computer on the television, wanting to view photos taken with a digital still camera or smart phone's camera on a tablet computer or a work computer to share the photos with guests. Many, many other examples can be imagined in which data on one device in the device-sphere is desired to be accessible from another device in the device-sphere.

What is needed is a way to improve continuity of a user's experience across the multiple devices of the user's device-sphere.

SUMMARY OF THE INVENTION

In accordance with the present invention, devices of an individual's device-sphere cooperate with a device-sphere manager to improve continuity of the user's experience using any of the devices. The device-sphere manager continuously maintains device images for each device of the device-sphere such that the entirety of all constituent devices are fully backed up. In addition, when the user makes a change on one device of the device-sphere, the device-sphere manager propagates the change to other devices of the device-sphere. For example, if the user specifies a user preference that, when a web browser on a first device is to initially start up opening all tabs from the previous user session, that change is reported to the device-sphere manager and the device-sphere manager propagates that preferences to all devices of the device-sphere.

When a device's state changes, the device reports the change to the device-sphere manager. The device-sphere manager modifies the device image for the reporting device and informs other devices of the device-sphere that corresponding changes should be made in the other devices as well.

Each device image includes application records representing applications installed in the subject device. The application records also include data representing user-selected preferences, extra components of the application installed in the device, and data managed by the application. In the example of a web browser, extra components such as fonts, plug-ins, add-ons, etc. are recorded and propagated across the multiple devices of the device sphere. In addition, web browser data, such as browsing histories, saved passwords, and saved form data, is also stored in the device image and propagated across multiple devices of the device-sphere.

The device image for each device also includes partition images of each of one or more partitions of persistent storage of the device. Accordingly, any device of the device-sphere can be replicated completely and thoroughly in a matter of hours or even minutes.

The device image for each device includes a desktop image that specifies applications in use, data files open, and GUI locations within a GUI desktop of various windows corresponding to the applications and open files. Accordingly, when a user stops use of one device of the device-sphere and begins use of another device of the device-sphere, the usage state of the first device represented by the desktop image is replicated in the other device.

A data image for the device-sphere represents data shared among the constituent devices of the device-sphere. All reported changes to the shared data from any device are effected in the data image. Thus, all data originating from any device of the device-sphere is very quickly available to any other device of the device-sphere. For example, if the user take a photograph using one device, e.g., a smart phone or a digital camera, the change in the data is reported to the device-sphere manager, and the device-sphere manager effects the change in the data image for the device-sphere. Once the change is effected in the data image, any device of the device-sphere can access the changed data, e.g., the new photograph. No steps are required of the user to access photographs or other data on her smart phone from any other device in her device-sphere.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
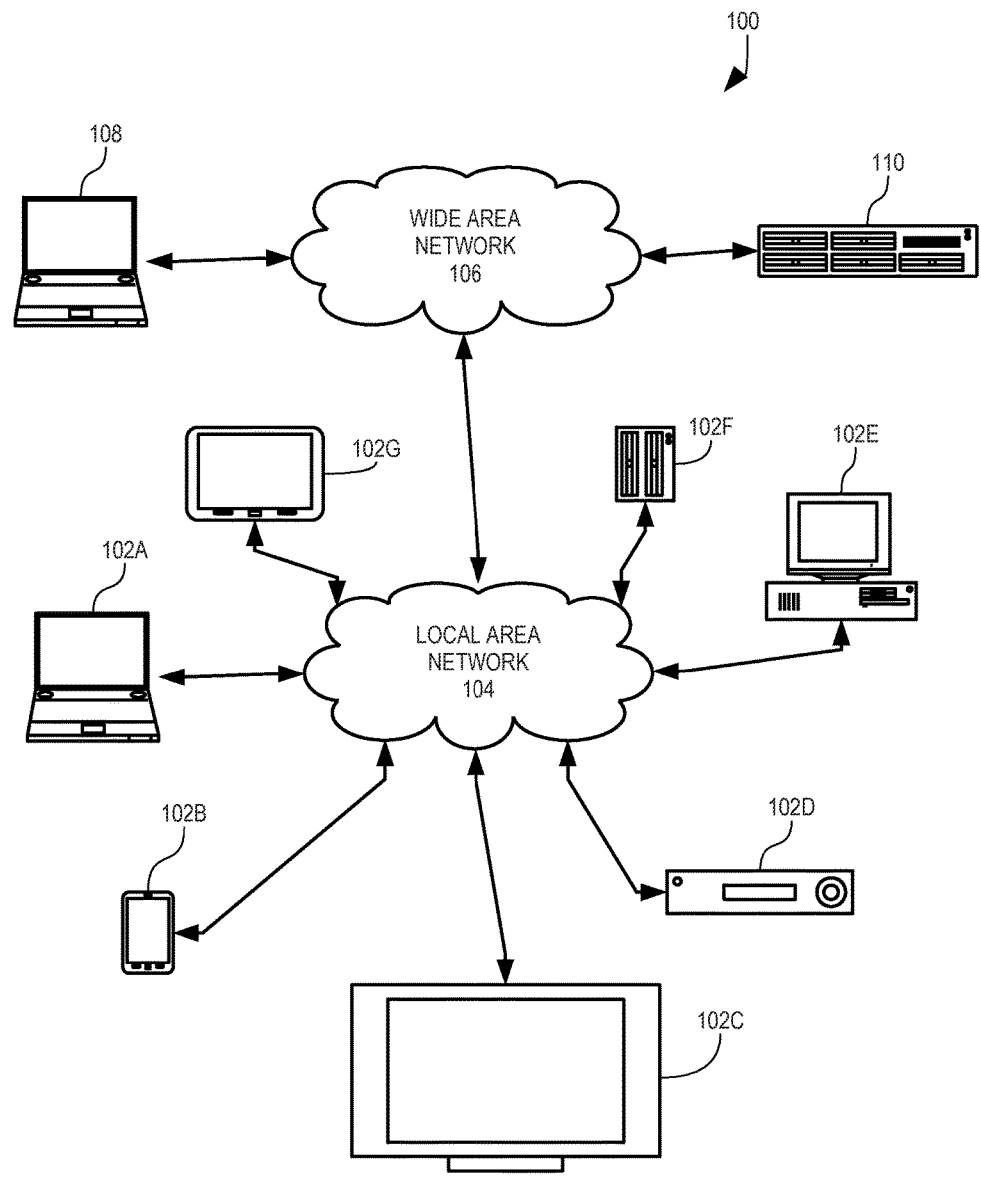
FIG. 1 is a diagram showing a number of devices and a device-sphere manager that cooperate to migrate a user session from one device to another in accordance with one embodiment of the present invention.

In accordance with the present invention, devices 102A-G (FIG. 1) of an individual's device-sphere cooperate to improve continuity of the user's experience using any of devices 102A-G and 108. In this illustrative example, the user's device-sphere includes devices 102A-G, device 108, and device-sphere manager 110. Devices 102A-G are coupled to one another through a local area network (LAN) 104, which can be owned and operated by the individual user in her home. There are a wide variety of computing devices that can be included in one's device-sphere; the devices shown in FIG. 1 are merely illustrative. Device 102A is a laptop computer. Device 102B is a smart phone. Device 102C is a modern, networked television. Device 102D is a networked PVR (Personal Video Recorder). Device 102E is a desktop computer. Device 102F is a NAS (Network-Attached Storage) appliance. Device 102G is a tablet computer.

Device 108 is remotely located, being connected to LAN 104 though a wide area network (WAN) 106. In this illustrative embodiment, device 108 connects to LAN 104 through WAN 106 through a Virtual Private Network (VPN) connection. In this illustrative embodiment, WAN 106 is the Internet.

Device-sphere manager 110 is also connected to LAN 104 though WAN 106. Device-sphere manager 110 provides cloud services to the individual user through any of devices 102A-G and 108. Such cloud services include providing continuity of the user's experience across devices 102A-G and 108 and can also include e-mail, photo and video hosting and sharing, document editing and hosting, social networking, calendaring, and music streaming, for example.

Device-sphere manager 110 provides continuity of the user's experience across devices 102A-G and 108 using a device-sphere record 200 (FIG. 2) that includes a device image 204 for each of devices 102A-G and 108 and a data image 206. Each of device images 204 represents a rather complete state of a respective one of devices 102A-G and 108. Data image 206 represents a rather complete state of data stored on the devices of the subject device-sphere, i.e., the device-sphere represented by device-sphere record 200. User identifier 202 identifies the user whose devices are constituent devices of the subject device-sphere. User identifier 202 can also serve as an identifier of the device-sphere itself. Desktop image 208 represents the user's most recently closed desktop session such that it can be migrated from one device to another in the manner described below in greater detail. Device-sphere change log 210 represents all changes made to device images 204, data image 206, and desktop image 208 and at what times those changes were made.

Device image 204 (FIG. 3) represents the state of one of devices 102A-G and 108. In this illustrative example, device image 204 represents the state of device 102A. Similar device images 204 (FIG. 2) represent the state of other devices in a manner analogous to that described below in the illustrative context of device 102A.

Digital fingerprint 302 (FIG. 3) is a digital fingerprint of device 102A to identify and authenticate device 102A. Digital fingerprints offer the advantage of being more stable and less amenable to spoofing that are IP addresses and MAC addresses. Digital fingerprints are known and described in U.S. Patent Application Publication 2011/0093503 for "Computer Hardware Identity Tracking Using Characteristic Parameter-Derived Data" by Craig S. Etchegoyen (filed Apr. 21, 2011) and that description is incorporated herein in its entirety by reference.

Device image 204 includes one or more partition images 304, each of which is a complete image of a partition of persistent storage of device 102A. Partition images 304 enable very quick reconstruction of the whole of persistent storage of device 102A. For example, if device 102A is destroyed or suffers a catastrophic failure resulting in loss of data, device 102A can be replaced with a new device and its entire state as represented in persistent storage can be replicated in the new device, including all software installation, software settings, and user data.

While partition images 304 inherently stores data representing all software installed on device 102A and details regarding that software, device image 204 includes application records 306 that includes data representing an abstraction of all that information to facilitate synchronization of user preferences across multiple devices in a manner described more completely below. Each application record 306 represents a state of an application installed on device 102A.

Application 308 identifies the application in a globally unique manner. Settings 310 represent settings and preferences specified by the user during use of the subject application, i.e., the application represented by application record 306. Extras 312 represent elements and components that might have been added to the subject application by the user. Examples of such extras include fonts, plug-ins, add-ons, etc. Data 314 represents data maintained by the application. An example of such data for a web browser includes browsing history, saved passwords, saved form data, saved certificates, etc. An example of such data for an office suite of software can include the user's contact information that such office suites use to build template documents.

It should be appreciated that the particular structure of application record 306 is merely illustrative. What is important is that enough of the state of a given application is stored in application record 306 that changes to that state made by the user can be propagated to others of devices 102A-G and 108.

Device image 204 includes abstraction of other data that is to be synchronized across devices 102A-G and 108. Contacts 316 stores contact information for a number of acquaintances of the user. Calendar 318 stores data representing a calendar of events and appointments of the user. Bookmarks 320 stores data representing URLs of resources that the user wishes to keep reachable in the future. Notes 322 represent data entered by the user for future reference.

Contacts 316, calendar 318, bookmarks 320, and notes 322 generally fall under the heading of "personal information" and are managed by applications known generally as "personal information managers." It should be appreciated that the personal described herein is merely illustrative and that many other types of data can be considered "personal information."

As described briefly above and in more detail below, data image 206 represents a rather complete state of data stored on the devices of the subject device-sphere. Data root 324 specifies a device-specific path to a root of data stored in data image 206. In an embodiment in which device 102A uses the Linux operating system, data root 324 could specify "/home/craig" as the root of data stored in data image 206. Accordingly, data at a path of "/documents/text document 1.odt" would be stored on device 102A with the full path being "/home/craig/documents/text document 1.odt". In an embodiment in which device 102A uses a version of the Windows operating system, data root 324 could specify "C:\Users \Craig" as the root such that "/documents/text document 1.odt" would be stored on device 102A with the full path being "C:\Users\Craig\documents\text document 1.odt", requiring that the forward slashes of the relative path be converted to Microsoft's convention of back slashes.

If data image 206 stores multiple bodies of data, multiple data roots are required. To illustrative this, media root 326 represents a root of a second body of data represented in data image 206. For example, many operating systems automatically provide a "public" data space for storage of data files to be shared among multiple users of the same device. In Windows, it can be "C:\Users\Public." Similarly, in Linux, the media data root can be "/home/public."

Desktop image 328 represents the most recently saved desktop session of device 102A and is described in greater detail below.

Figure 4:
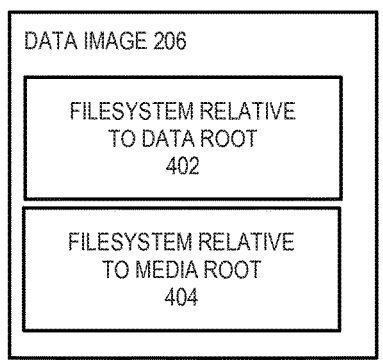
FIG. 4 is a block diagram showing a data image of the device-sphere record of FIG. 2 in greater detail.

Data image 206 is shown in greater detail in FIG. 4. Data image 206 includes a file system relative to the data root 402 and a file system relative to the media root 404. In this illustrative embodiment, data image 206 is designed to represent all data stored in a user's root directory and any sub-directories thereof and all data stored in a public root directory and any sub-directories thereof. However, it should be appreciated that the selection of the particular directories to be represented in data image 206 can be chosen differently.

Figure 2:
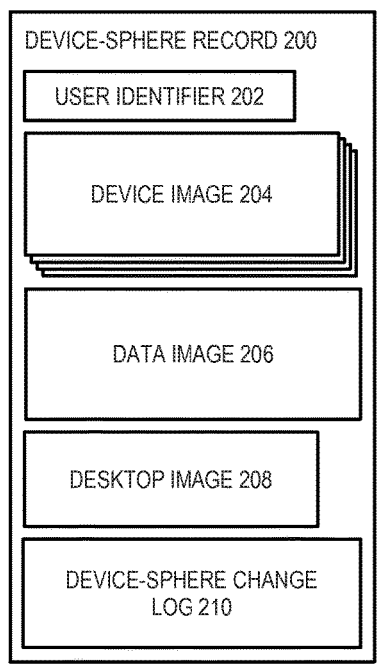
FIG. 2 is a block diagram showing an example of a device-sphere record that represents a collective state of a device-sphere in accordance with one embodiment of the present invention.
Figure 3:
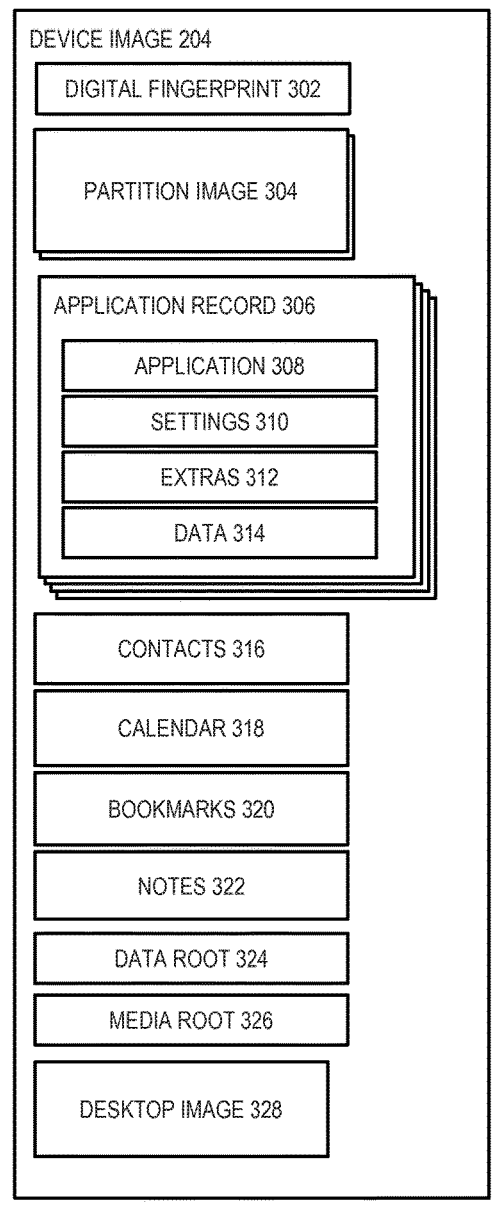
FIG. 3 is a block diagram showing a device image of the device-sphere record of FIG. 2 in greater detail.
Figure 5:
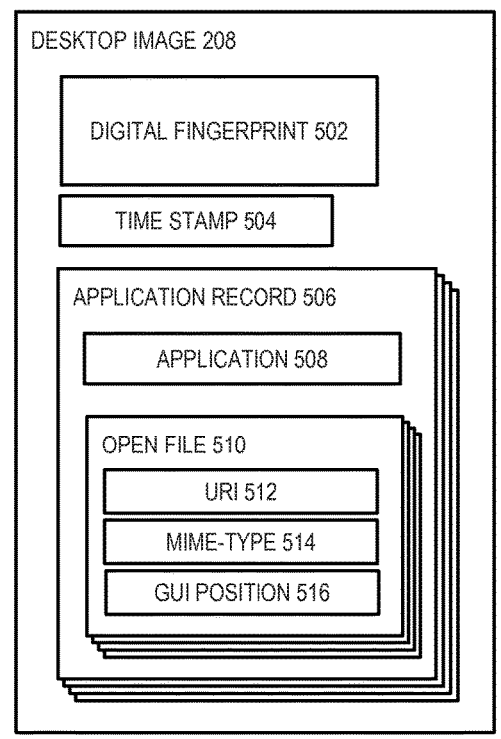
FIG. 5 is a block diagram showing a desktop image of the device-sphere record of FIG. 2 in greater detail.

Desktop image 208 (FIG. 2) is shown in greater detail in FIG. 5. Unless otherwise noted herein, desktop image 208 is equally representative of desktop image 328 (FIG. 3). Digital fingerprint 502 (FIG. 5) is a globally unique identifier of the one of devices 102A-G and 108 whose desktop session is represented by desktop image 208. Digital fingerprint 502 can be omitted from desktop image 328 (FIG. 3) because device image 204 includes digital fingerprint 302. Time stamp 504 (FIG. 5) specifies the current time and date and the creation time and date of desktop image 208.

Desktop image 208 includes a number of application records 506, each of which represents an application in use at the time desktop image 208 is formed. Application 508 identifies the subject application. In some embodiments, application 508 is omitted and associations within each device for MIME (Multipurpose Internet Mail Extensions) types, more recently referred to as Internet media types, determine which applications are to open each of open files 510.

Open files 510 represent a number of data files that are open by the subject application, i.e., the application represented by application record 506, at the time desktop image 208 is formed.

URI (universal resource identifier) 512 specifies the location of the open file. In this illustrative embodiment, URI 512 specifies the location of the open data file by a path within file system relative to the data root 402 or file system relative to the media root 404 and data identifying which.

MIME-type 514 specifies a type of data of the open file by MIME type. MIME types include a type and a subtype and can also include a number of additional parameters. For example, a web page in textual HTML has the MIME type of "text/html" wherein the type is "text" and the subtype is "html." A common additional parameter specifies the particular character set of the web page.

GUI position 516 specifies the location and size of the window in session 800 (FIG. 8) of the open file of the subject application, including the relative depth of the window so as to indicate the which windows occlude other windows.

Thus, desktop image 208 specifies, for a given desktop usage session, which data files are open by which applications and at which positions is a display.

Figure 6:
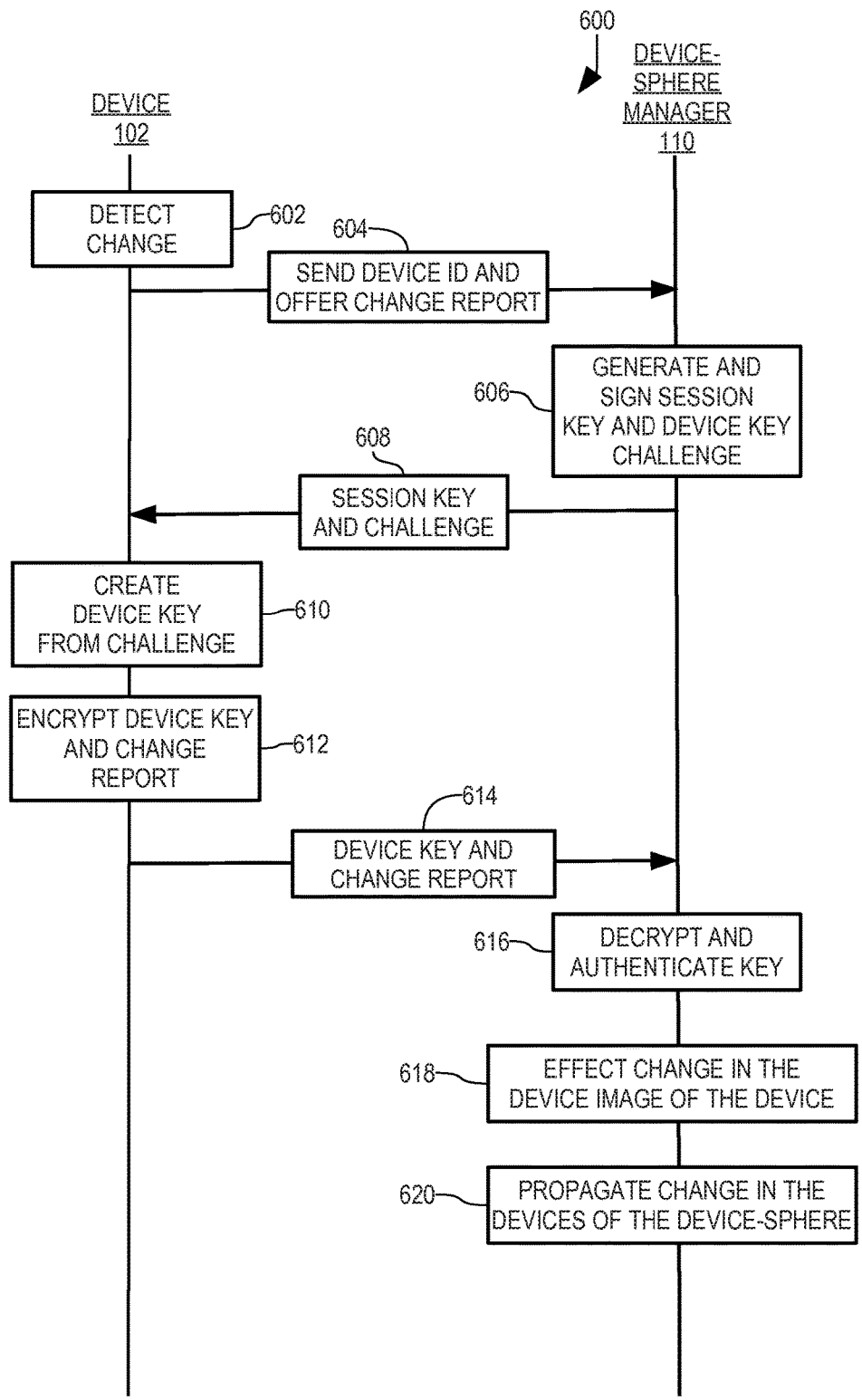
FIG. 6 is a transaction diagram illustrating one embodiment according to the invention of a method by which a device of FIG. 1 reports changes in the device's state to the device-sphere manager of FIG. 1.
Figure 7:
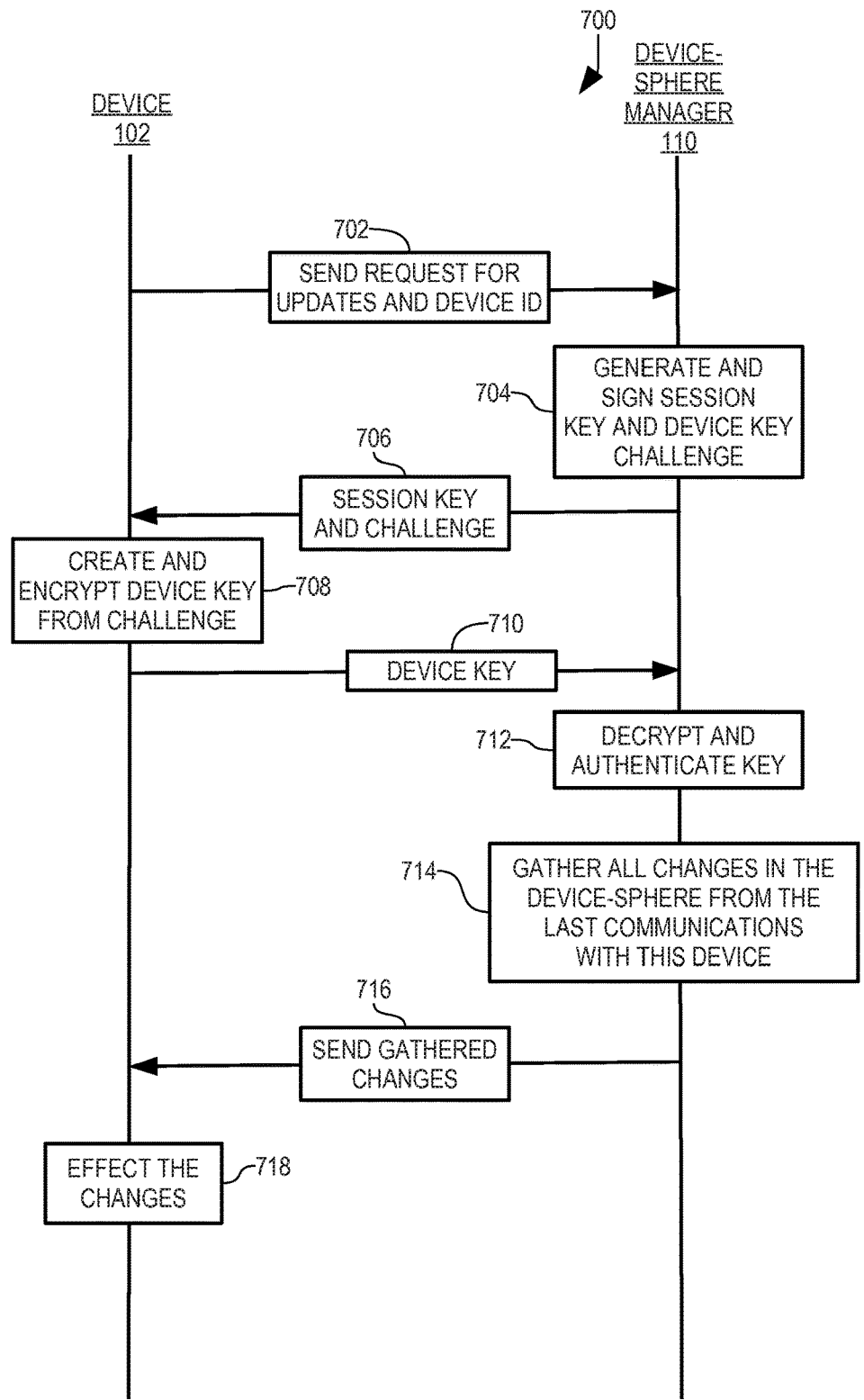
FIG. 7 is a transaction diagram illustrating one embodiment according to the invention of a method by which a device of FIG. 1 receives data representing state changes from the device-sphere manager of FIG. 1 and effects those state changes.

To improve continuity of the user's experience, devices 102A-G and 108 report changes to their respective states in the manner shown in transaction flow diagram 600 (FIG. 6) and make changes corresponding to those made on others of devices 102A-G and 108 in the manner shown in transaction flow diagram 700 (FIG. 7). To facilitate appreciation and understanding of the discussion of transaction flow diagrams 700 and 800, it is helpful to understand some of the configuration of devices 102A-G and 108.

Figure 13:
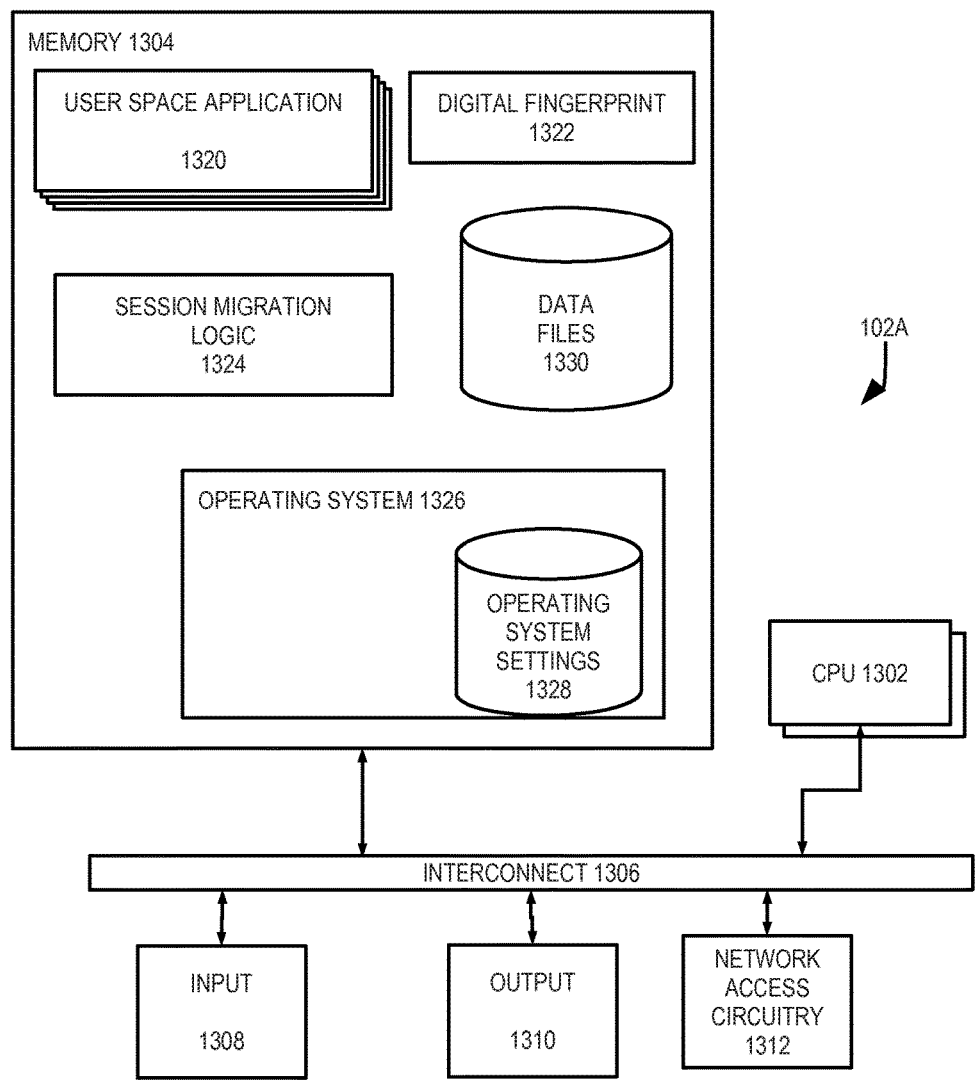
FIG. 13 is a block diagram showing one of the devices of FIG. 1 in greater detail.

Device 102A is shown in greater detail in FIG. 13, most of which is described in greater detail below. Unless otherwise noted herein, FIG. 13 is equally applicable to devices 102B-G and 108.

Device 102A includes an operating system 1326, which in turn includes operating system settings 1328. An operating system is logic implemented in a computing device that provides services used by other logic implemented in the computing device. The services typically include management of computer resources such as file systems, peripheral device support, networking services, and computer process management. Generally, most users don't directly use an operating system but rather use logic that in turn uses the operating system to perform various tasks. Examples of operating systems in use today include Linux, Unix, MacOS, and various incarnations of the Windows operating system.

Figure 14:
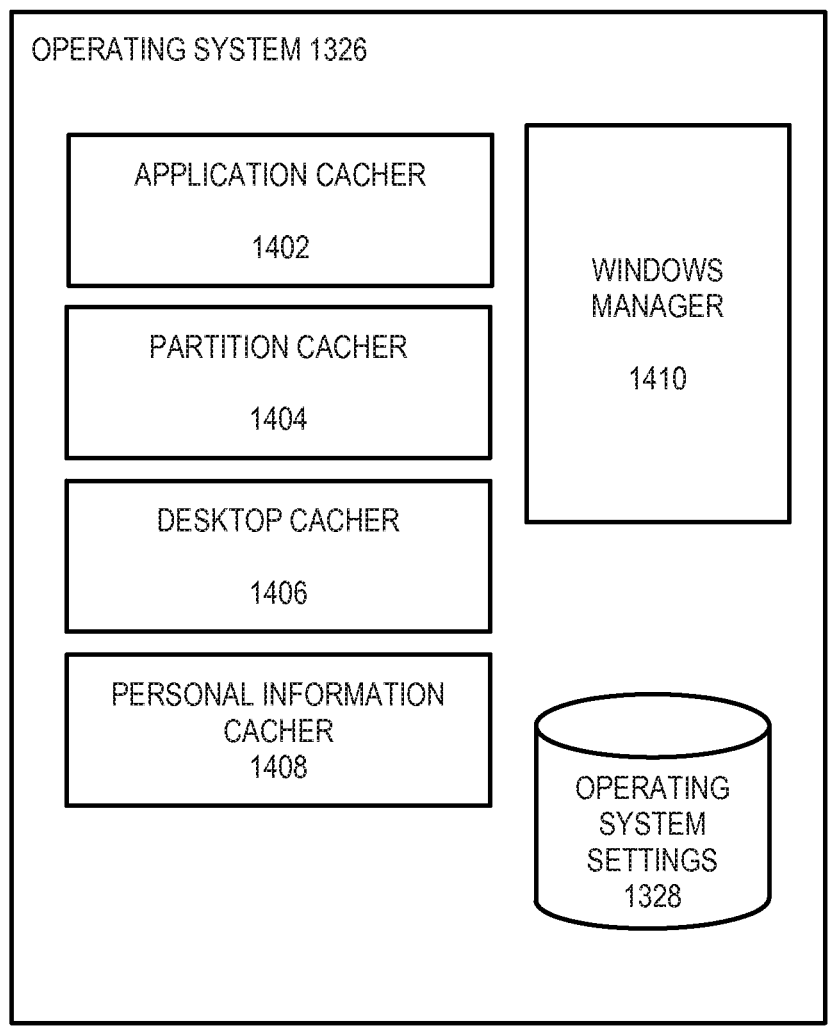
FIG. 14 is a block diagram showing various cachers of the device of FIG. 13.

Operating system 1326 is shown in greater detail in FIG. 14. Operating system 1326 includes an application cacher 1402, a partition cacher 1404, a desktop cacher 1406, and a personal information cacher 1408. Cachers 1402-1408 generally behave in the same manner, detecting changes made to the state of device 102A and reporting those changes to device-sphere manager 110 such that device-sphere manager 110 can update the one of device images 204 representing device 102A and data image 206 to accurately represent the changed state of device 102A. Each of cachers 1402-1408 differ in the particular parts of the state of 102A monitored and the form in which changes are reported to device-sphere manager 110.

Application cacher 1402 monitors user space applications 1320 (FIG. 13), session migration logic 1324, and operating system 1326 for changes. Such changes include updates to new versions, changes in user settings and preferences, changes in application data and extras. For example, if the user configures a new printer for use with device 102A, that configuration is represented by changes made to operating system settings 1328, and application cacher 1402 detects that change and reports it to device-sphere manager 110.

Partition cacher 1404 monitors all persistent storage partitions of memory 1304 (FIG. 13) for changes and reports any detected changes to device-sphere manager 110 in a form that enables incremental updating of partition images 304 (FIG. 3). If the detected partition changes also change a data file in data files 1330 (FIG. 13) in a portion of a file system represent in data image 206 (FIG. 4), partition cacher 1404 (FIG. 14) also reports the detected to device-sphere manager 110 in a form that enables incremental updating of data image 206.

Desktop cacher 1406 monitors a windows manager 1410 for the opening, closing, and movement of windows in the display of device 102A, e.g., one of user output devices 1310 (FIG. 13). Desktop cacher 1406 reports all detected changes to device-sphere manager 110 for updating of desktop image 328 (FIG. 3) and desktop image 208 (FIG. 2). Desktop image 208 represents the most recently updated desktop image 328 (FIG. 3) of any of device images 204 (FIG. 2).

Personal information cacher 1408 monitors all applications that can modify any type of personal information data that can be stored as contacts 316 (FIG. 3), calendar 318, bookmarks 320, and notes 322. Personal information cacher 1408 reports any detected changes to device-sphere manager 110.

The detecting and reporting of a change in accordance with transaction flow diagram 600 (FIG. 6) is described in the context of application cacher 1402 (FIG. 14). However, the following description of transaction flow diagram 600 is equally applicable to partitioner cacher 1404, desktop cacher 1406, and personal information cacher 1408 unless otherwise noted herein.

In step 602 (FIG. 6), application cacher 1402 detects a change that is to be reported to device-sphere manager 110. In step 604, application cacher 1402 sends a device identifier of device 102A that is part of digital fingerprint 1322 (FIG. 13) along with data indicating that a change has been detected in device 102A, thereby offering a report of the change.

Upon receipt of the device identifier and offer of a change report, device-sphere manager 110 generates and signs a session key and a device key challenge in step 606. Session keys and their generation are known and are not described herein.

To create the device key challenge, device-sphere manager 110 retrieves digital fingerprint 302 (FIG. 3) representing device 102A using the received device identifier. The device key challenge specifies all or part of one or more of device attribute fields of digital fingerprint 302 to be included in the device key and is described in greater detail below.

In step 608, device-sphere manager 110 sends the session key and device key challenge to device 102A.

In response to receipt of the session key and device key challenge, application cacher 1402 (FIG. 14) creates the device key from digital fingerprint 1322 (FIG. 13) using the device key challenge in step 610 (FIG. 6).

The device key challenge specifies the manner in which a dynamic device key (DDK) is to be generated from the attributes of device 102A represented in digital fingerprint 1322. The challenge specifies a randomized sampling of attributes of device 102, allowing the resulting DDK to change each time device 102A is authenticated. There are a few advantages to having each DDK represent different samplings of the attributes of device 102A. One is that any data captured in transit through wide area network 106 (FIG. 1) in a prior authentication of device 102A cannot be used to spoof authentication of device 102A using a different device when the device key challenge has changed. Another is that, since only a small portion of the attributes of device 102A are used for authentication at any time, the full set of attributes of device 102A cannot be determined from one, a few, several, or even many authentications of device 102A.

In step 612 (FIG. 6), application cacher 1402 encrypts the DDK and the report of the detected change in state of device 102A using a public key of device-sphere manager 110 and public-key infrastructure (PKI) and the session key received in step 608.

In step 614, application cacher 1402 sends the encrypted DDK and change report to device-sphere manager 110.

In response to receipt of the encrypted device key and change report, device-sphere manager 110 decrypts and authenticates the dynamic device key in step 616. Device-sphere manager 110 decrypts the DDK using the session key generated in step 606 and a private key of device-sphere manager 110. Device-sphere manager 110 authenticates the DDK by applying the same device key challenge sent in step 608 to digital fingerprint 302 (FIG. 3) of the device image 204 corresponding to device 102A. If digital fingerprint 302 matches digital fingerprint 1322 (FIG. 13), application of the same device key challenge to each should yield precisely the same dynamic device key.

If device-sphere manager 110 determines that device 102A is authentic in step 616 (FIG. 6), device-sphere manager 110 effects the reported change in the one of device images 204 (FIG. 2) representing device 102A. Since the report is from application cacher 1402 (FIG. 14) in this illustrative example, the report specifies and device-sphere manager 110 effects changes to be made to one or more of application records 306 (FIG. 3). If the report is from partition cacher 1404 (FIG. 14) instead, the report specifies and device-sphere manager 110 effects changes to be made to one or more of partition records 304 (FIG. 3) and data image 206 (FIG. 4) in instances in which the reported change affects data represented in data image 206. If the report is from desktop cacher 1406 (FIG. 14), the report specifies and device-sphere manager 110 effects changes to be made to one or more of desktop image 328 (FIG. 3) and desktop image 208 (FIG. 2). If the report is from personal information cacher 1408 (FIG. 14), the report specifies and device-sphere manager 110 effects changes to be made to one or more of contacts 316 (FIG. 3), calendar 318, bookmarks 320, and notes 322.

Once device-sphere manager 110 has effected the reported changes in step 618 (FIG. 6), device-sphere manager 110 propagates the change in devices 102B-G and 108, storing data representing the changes in device-sphere change log 210 along with time stamps indicating the time at which each change was effected. Some of devices 102A-G and 108 are highly-available, meaning that they are in operation nearly all the time. Examples include device 102B (a smartphone), device 102D (a set-top box), and device 102F (network-attached storage). Others of devices 102A-G and 108 are typically much less available and are only in operation when being used by the user whose device-sphere 100 is represented in FIG. 1. Accordingly, many of devices 102A-G and 108 can be powered off when device-sphere manager 110 is to propagate effected changes in step 618 (FIG. 6). Accordingly, device-sphere manager 110 broadcasts a message to devices 102A-G and 108 that changes are available and relies on devices 102A-G and 108 to request those changes. When any of devices 102A-G and 108 boots up, it requests from device-sphere manager 110 all changes since the last change implemented by the device.

The manner in which each of devices 102A-G and 108 requested data representing recent changes to device-sphere record 200 (FIG. 2) is illustrated in transaction flow diagram 700 (FIG. 7). Transaction flow diagram 700 is described in the context of device 102A requesting change data but is equally applicable to devices 102B-G and 108 unless otherwise noted herein.

In step 702, device 102A sends a request for changes to be effected in the state of device 102A and a device identifier of device 102A from digital fingerprint 1322 (FIG. 13). In this illustrative embodiment, the request includes a time stamp representing the most recent change of which device 102A is aware. That most recent change can be the last change reported in the manner illustrated by transaction flow diagram 600 (FIG. 6) or the last change received and effected in the manner illustrated by transaction flow diagram 700 (FIG. 7).

In response to receipt of the request and the device identifier in step 702, device-sphere manager 110 generates a session key and device key challenge in the manner described above with respect to step 606 (FIG. 6). In step 706 (FIG. 7), device-sphere manager 110 sends the session key and device key challenge to device 102A.

In response to receipt of the session key and device key challenge in step 706, device 102A creates and encrypts a dynamic device key from the challenge in step 708 in the manner described above with respect to steps 610-612 (FIG. 6), except that no change report is included with the DDK. In step 710 (FIG. 7), device 102A sends the encrypted DDK to device-sphere manager 110.

In response to receipt of the encrypted DDK in step 710, device-sphere manager 110 decrypts the DDK and uses the decrypted DDK to authenticate device 102A in the manner described above with respect to step 616 (FIG. 6). If device-sphere manager 110 determines in step 712 that device 102A is authentic, device-sphere manager 110 gathers all changes recorded in device-sphere change log 210 with time stamps later than the time stamp included in the request of step 702.

There are a number of changes that are so device-specific that device-sphere manager 110 doesn't gather them unless specifically asked to. For example, partition images 304 (FIG. 3) for one device aren't useful for another device unless the other device is to completely replicate and replace the device. Similarly, changes to a graphical user interface desktop aren't useful for a device without a graphical use interface, such as a network-attached storage appliance.

In step 716, device-sphere manager 110 sends the gathered changes, encrypted with the session key, to device 102A.

In step 718, device 102A effects the changes. The manner in which device 102A effects the changes varies according to the nature of the changes.

Application cacher 1402 (FIG. 14) effects changes to applications, application settings, application extras, and application data. Application cacher 1402 effects changes to applications by updating the application if the change is to a newer version. If the change is uninstallation of an installed application, application cacher 1402 uninstalls the application. If the change is installation of a new application, application cacher 1402 installs the application.

Application cacher 1402 effects changes to application settings by directly modifying data representing settings of the subject application. Alternatively, application cacher 1402 effects changes to application settings using an application programming interface (API) of the subject application or by emulating a human user modifying the settings of the application through a user interface.

Application cacher 1402 effects changes to application extras in the manner described above with respect to effecting changes in applications, since extras are typically updated, installed, and uninstalled. Application cacher 1402 effects changes to settings of application extras in the manner described above with respect to effecting changes in application settings.

Application cacher 1402 effects changes to application data by directly modifying data representing settings of the subject application. Alternatively, application cacher 1402 effects changes to application data using an application programming interface (API) of the subject application or by emulating a human user modifying the data of the application through a user interface.

Partition cacher 1404 effects changes in data stored in memory 1304 (FIG. 13) of device 102A by modifying the data directly in memory 1304. In this illustrative embodiment, the changes are specified as incremental changes to a data file such that only relatively small portions of each data file requires change. In an alternative embodiment, the changes received from device-sphere manager 110 can include full data files to replace obsolete data files.

The manner in which desktop cacher 1406 effects changes to the desktop are more complex and are described more completely below.

Personal information cacher 1408 (FIG. 14) effects changes to personal information in the manner described above with respect to affecting changes in application data using default applications established in operating system 1326. For example, operating system 1326 stores data identifying a default e-mail client application and personal information cacher 1408 modifies data representing changed contacts in that default e-mail client application in the manner described above for effecting changes in other application data.

Figure 8:
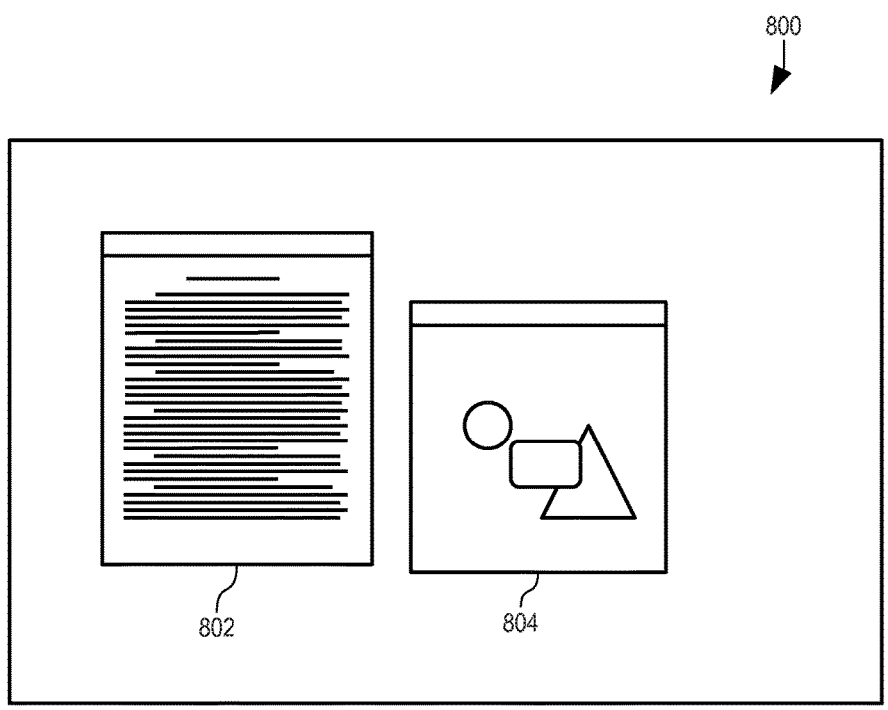
FIG. 8 is a block diagram showing a desktop that can be represented by the desktop image of FIG. 5.

To facilitate appreciation and understanding of the effecting of desktop changes by desktop cacher 1406, FIG. 8 shows a simple desktop session involving two applications 802 and 804 on a computer desktop 800. In this illustrative example, computer desktop 800 is to be reported as changed by device 102E (FIG. 1) and subsequently reconstructed by device 102A. The user has been working on device 102E, using application 802 (FIG. 8) to edit a text document and application 804 to edit a drawing, and now wishes to continue work using device 102A using the same applications to edit the same data files.

Figure 9:
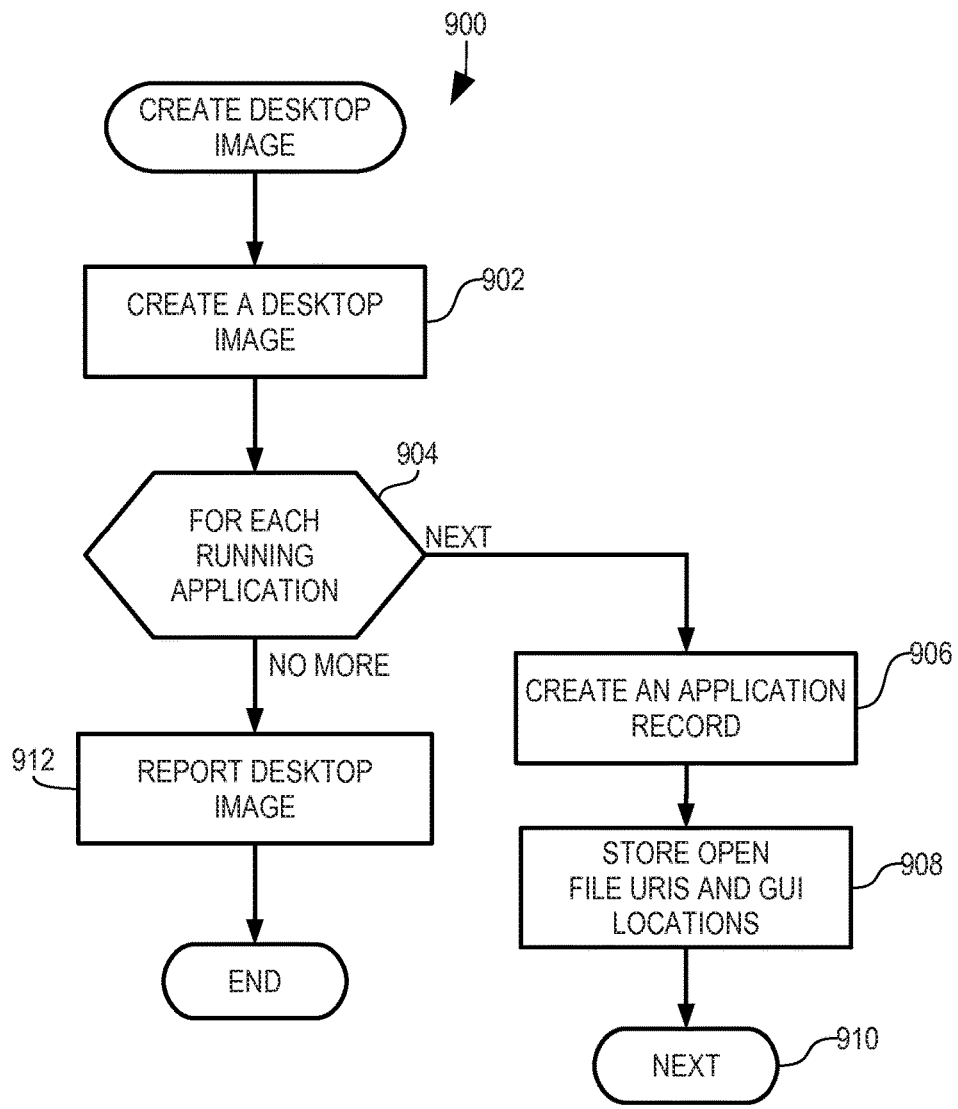
FIG. 9 is a logic flow diagram showing the reporting of a desktop state in accordance with one embodiment of the present invention.

To report a changed desktop, device 102E first creates a desktop image containing data representing desktop 800 in the manner illustrated by logic flow diagram 900 (FIG. 9).

In step 902, device 102E creates a desktop image such as desktop image 208 (FIG. 5) to represent desktop 800 (FIG. 8). Device 102E includes its own digital fingerprint as digital fingerprint 502.

Loop step 904 (FIG. 9) and next step 910 define a loop in which device 102E processes each of the user-space applications currently in use in desktop 800 according to steps 906 and 908. During each iteration of the loop of steps 904-910, the particular application processed by device 102E is sometimes referred to as the subject application in the context of logic flow diagram 900.

In step 906, device 102E creates an application record such as application record 506 (FIG. 5) for the current application. Application 508 identifies the subject application. In some embodiments, application 506 is omitted and associations within device 102A for MIME (Multipurpose Internet Mail Extensions) types, more recently referred to as Internet media types.

In step 908 (FIG. 9), device 102E stores URI (uniform resource identifiers) and GUI (graphical user interface) window locations for each open file of the subject application. For each open file of the subject application, device 102E creates an open file record 510. URI 512 specifies the location of the open file, including the device on which the open file is stored. MIME-type 514 specifies a type of data of the open file by MIME type. MIME types include a type and a subtype and can also include a number of additional parameters. For example, a web page in textual HTML has the MIME type of "text/html" wherein the type is "text" and the subtype is "html." A common additional parameter specifies the particular character set of the web page. GUI position 516 specifies the location and size of the window in desktop 800 (FIG. 8) of the open file of the subject application, including the relative depth of the window so as to indicate the which windows occlude other windows.

From step 908 (FIG. 9), processing by device 102E transfers through next step 910 to loop step 904 to process the next application according to the loop of steps 904-910. When all applications of desktop 800 have been processed, desktop image 208 (FIG. 5) represents all open files and GUI locations of windows within desktop 800 (FIG. 8) and processing by device 102E transfers to step 912 (FIG. 3).

In step 912, device 102E reports desktop image 208 (FIG. 5) to device-sphere manager 110 in the manner described above with respect to transaction flow diagram 600 (FIG. 6). After step 912, processing according to logic flow diagram 900 completes.

Figure 10:
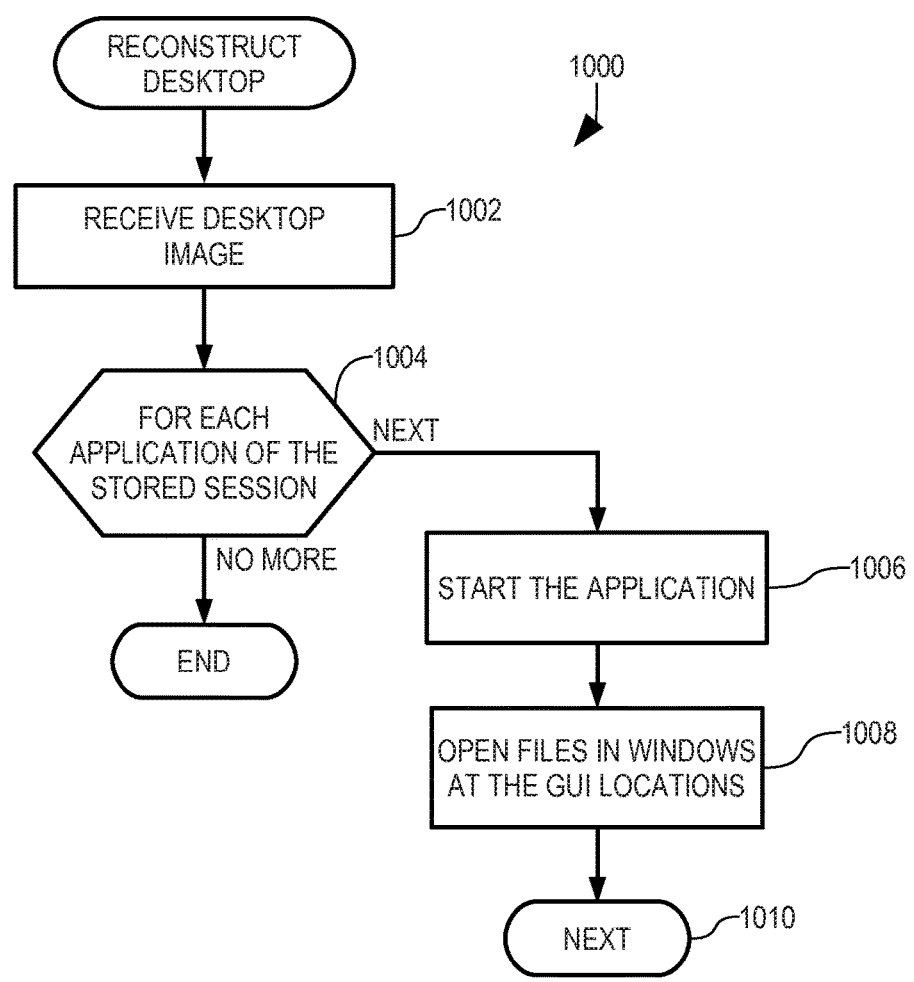
FIG. 10 is a logic flow diagram showing the reconstruction of a reported desktop state in accordance with one embodiment of the present invention.

To reconstruct desktop 800 (FIG. 8) according to a desktop image received from device-sphere manager 110 in the manner described above with respect to transaction flow diagram 700 (FIG. 7), device 102A uses reconstructs desktop 800 (FIG. 8) from desktop image 208 (FIG. 5) in the manner illustrated by logic flow diagram 1000 (FIG. 10).

In step 1002, device 102A receives the most recent desktop image 208 (FIGS. 2 and 5) from device-sphere manager 110.

Loop step 1004 (FIG. 10) and next step 1010 define a loop in which device 102A processes each of the application records 506 (FIG. 5) of the desktop image according to steps 1006 (FIGS. 10) and 1008. During each iteration of the loop of steps 1004-100, the particular application record processed by device 102A is sometimes referred to as the subject application record in the context of logic flow diagram 1000.

In step 1006, device 102A launches an application identified by application 508 of the subject application record. As described above, application 508 is omitted and associations within device 102A for MIME types in some embodiments. In such embodiments, desktop image 208 (FIG. 5) includes only open file records 510, and device 102A skips step 1006.

In step 1008 (FIG. 10), device 102A processes all open file records 510 (FIG. 5) to send URI 512 and GUI position 516 to cause the application to open the file identified by URI 512 in a window located at GUI position 516. In embodiments in which application 508 is omitted, device 102A uses MIME-type 514 to determine an application predetermined to be the one to process the data file type specified in MIME-type 514 within the operating system of device 102A and launches an instance of that application, providing URI 512 and GUI position 516. The result is that a new window opens in a session on device 102A in which the data file identified by URI 512 at a location specified by GUI position 516 for an application qualified to process the data file.

In some of devices 102A-G (FIG. 1) and 108, the entirety of the user's data as represented by data image 206 (FIG. 4) is replicated locally, i.e., within the device itself. In these devices, opening locally stored data files is straight forward. Others of devices 102A-G and 108 use device-sphere manager 110, or another device such as device 102F, as a data server.

Figure 11:
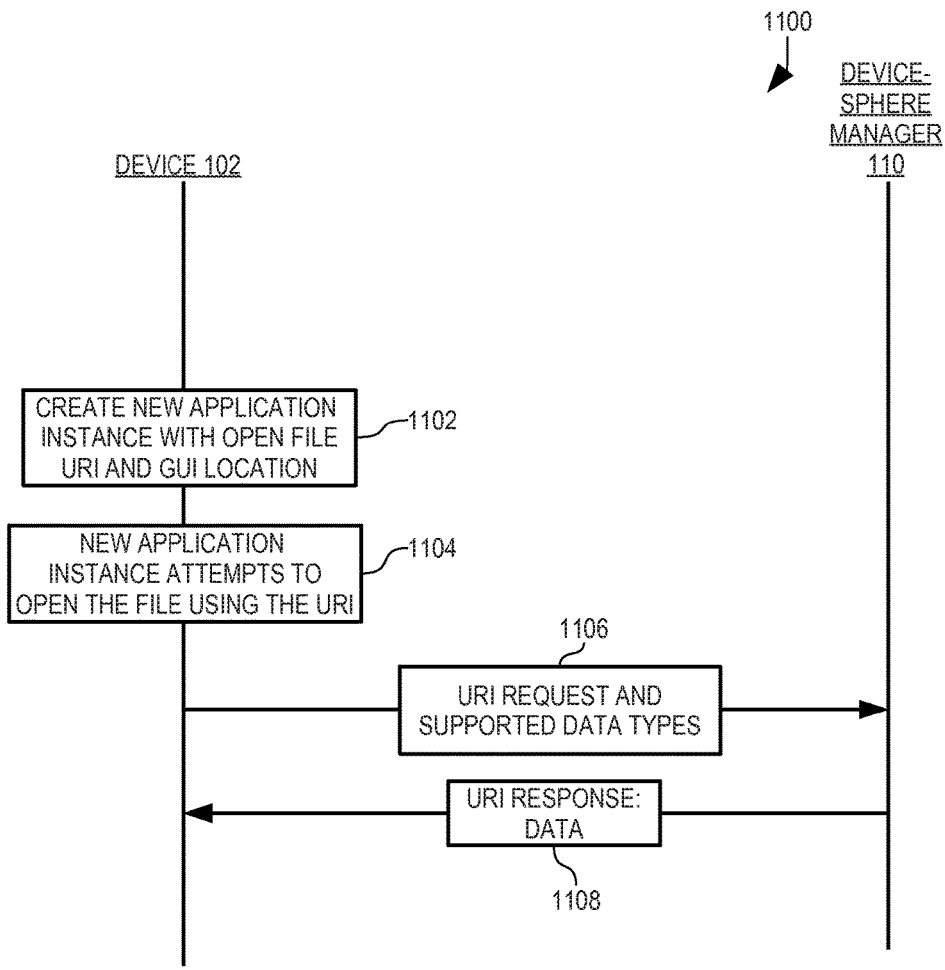
FIG. 11 is a transaction diagram illustrating one embodiment according to the invention of a method by which two devices of FIG. 1 cooperate to open data files represented by URIs in the session record.

Others of devices 102A-G and 108 use device-sphere manager 110, or another device such as device 102F, as a data server. Opening remotely stored data files is illustrated by transaction flow diagram 1100 (FIG. 11).

In step 1102, device 102A launches a new application instance using URI 512 and GUI position 516 in the manner described above with respect to step 1008 (FIG. 10). Devices 102A-G and 108 can vary widely in display dimensions and display resolutions. Accordingly, GUI positions within the display of each device are approximated and scaled to accommodate opening of multiple windows given each devices display size. In addition, some device, such as smart phones, have such small displays that each new window can use the entire screen in some embodiments.

In step 1104 (FIG. 11), the newly launched application instance attempts to open the data file identified by the URI.

In attempting to open the data file, device 102A sends a request in step 1106 to the device specified in the URI, e.g., device 102F or, in this illustrative example, device-sphere manager 110. Along with the request, device 102A sends a list of MIME types that device 102A is capable of handling. For some of the MIME types, device 102A has applications capable of properly processing that MIME type. For other MIME types, device 102A is capable of converting a data file from that MIME type to one that device 102A is capable of processing properly.

In step 1108, device-sphere manager 110 sends responsive data representing the data file identified by the URI received in step 1006 in a MIME type data format that device 102A supports as indicated by the MIME types specified in the request of step 1106. If the requested data file is not in any of the MIME types supported by device 102A, device-sphere manager 110 converts the data file to a MIME type that is supported by device 102A if device-sphere manager 110 has the capacity to do so and denies the request otherwise. In some embodiments, device-sphere manager 110 or device 102A can determine that the ability to edit the data file in the MIME type received should not be edited. Such can be the case if the received MIME type cannot handle formatting or features of the original format or if device 102A has no editing applications for the received MIME type. In either case, the data file will be opened in a "read only" mode on device 102A.

From step 1008 (FIG. 10), processing by device 102A transfers through next step 1010 to loop step 1004 to process the next application record according to the loop of steps 1004-1010. When all applications records of desktop image 208 (FIG. 5) have been processed, desktop 800 (FIG. 8) will have been restored on device 102A and processing by device 102A of logic flow diagram 1000 (FIG. 10) completes.

The end result is that desktop 800 (FIG. 8) is saved from device 102E and restored to device 102A. The user can thereafter continue editing the word processing document of window 802 and the drawing of window 804.

Figure 12:
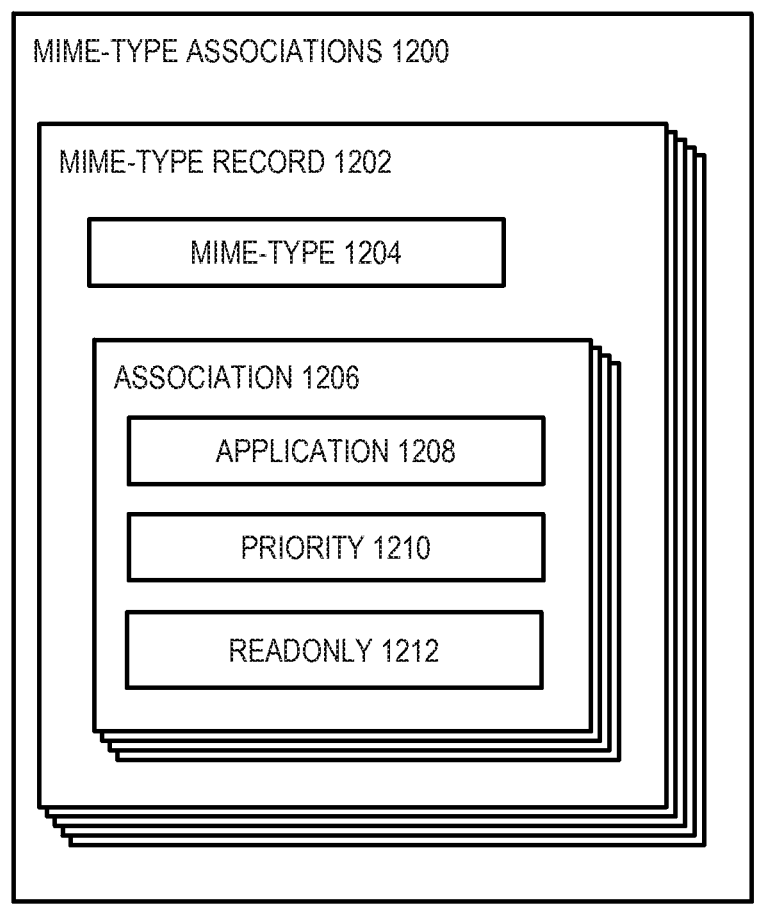
FIG. 12 is a block diagram of MIME-type associations that can be used to ensure that a data file represented by a URI can be properly processed by the recipient device.

As described above, opening a file in step 1008 (FIG. 10) includes using the URI of the file to retrieve the file from a device in the user's device-sphere and device 102A also sends data representing all MIME types that device 102A can process. Device 102A determines which MIME types it can process by reference to MIME-type associations 1200 (FIG. 12).

MIME-type associations 1200 includes a number of MIME-type records 1202, each of which represents associations for a given MIME-type, which is identified by MIME-type 1204. Each MIME-type record 1202 includes a number of associations 1206, each of which represents an application within device 102A that can process data files of the given MIME-type. Application 1208 identifies the application. Priority 1210 specifies a relative priority among all associations 1206 of a given MIME-type record 1202. Readonly 1212 indicates whether (i) the application specified by application 1208 can process the file in a manner in which the user can modify the file or (ii) the application and only display the file. The application identified by application 1208 can be merely a conversion application that converts data files of the type specified by MIME-type 704 to another type.

Upon receipt of the URI and MIME types supported by device 102A in step 1106 (FIG. 11), device-sphere manager 110 uses the URI to locate the data file identified by the URI and compares the MIME type of the data file to the MIME types supported by 102A. If the MIME type of the data file is not one supported by device 102A, device-sphere manager 110 uses its own set of MIME-type associations 1200 (FIG. 12) to determine whether device-sphere manager 110 can convert the requested data file to a MIME type that device 102A can process.

Device 102A is shown in greater detail in FIG. 13, which is equally representative of devices 102B-G and 108 unless otherwise noted here. Device 102A includes one or more microprocessors 1302 (collectively referred to as CPU 1302) that retrieve data and/or instructions from memory 1304 and execute retrieved instructions in a conventional manner. Memory 1304 can include generally any computer-readable medium including, for example, persistent memory such as magnetic and/or optical disks, ROM, and PROM and volatile memory such as RAM. As used herein, "computer-readable medium" excludes any transitory signals but includes any non-transitory data storage circuitry, e.g., buffers, cache, and queues, within transceivers of transitory signals.

CPU 1302 and memory 1304 are connected to one another through a conventional interconnect 1306, which is a bus in this illustrative embodiment and which connects CPU 1302 and memory 1304 to one or more input devices 1308, output devices 1310, and network access circuitry 1312. Input devices 1308 can include, for example, a keyboard, a keypad, a touch-sensitive screen, a mouse, a microphone, and one or more cameras. Output devices 1310 can include, for example, a display—such as a liquid crystal display (LCD)—and one or more loudspeakers. Network access circuitry 1312 sends and receives data through computer networks such as LAN 104 (FIG. 1).

Some of device 102A-G and 108 do not include input devices 1308 and/or output devices 1310. For example, device 102F (FIG. 1) is a network-attached storage appliance and has neither input devices 1308 nor output devices 1310. Device 102D is a networked PVR and includes input devices 1308 in the form of a remote control device and buttons on a front panel but—other than a small display and LED indicators—uses other devices, such as device 102C, for output to the user.

A number of components of device 102A (FIG. 13) are stored in memory 1304. In particular, user space applications 1320, session migration logic 1324 logic, and operating system 1326 are each all or part of one or more computer processes executing within CPU 1302 from memory 1304 in this illustrative embodiment but can also be implemented using digital logic circuitry. As used herein, "logic" refers to (i) logic implemented as computer instructions and/or data within one or more computer processes and/or (ii) logic implemented in electronic circuitry.

User space applications 1320 are applications the user can use to view or edit data files. Session migration logic 1324 saves and restores sessions in the manner described above. In embodiments in which device 102A interacts with a web server of device-sphere manager 110, at least one of user space applications 1320 is a web browser.

Operating system 1326 is the operating system of device 102A and is described more completely above.

In this illustrative embodiment, operating system 1326 optimizes data traffic among devices 102A-G and 108 in the manner described in co-pending, commonly owned U.S. Patent Application 61/770,662 filed Feb. 28, 2012 by Craig S. Etchegoyen for "Device-Specific Content Delivery" and that description is incorporated herein by reference.

Digital fingerprint 1322, data files 1330, and operating system settings 1328, which include MIME-type associations 1200 (FIG. 12), are data stored persistently in memory 1304 (FIG. 13). Digital fingerprint 1322 includes data specific to hardware elements of device 102A, such as serial numbers and parameters of hardware components of device 102A, to serve as a globally unique identifier of device 102A. Data files 1330 includes one or more data files that the user might want to view or edit using any of user space applications 1320 on any of devices 102A-G and 108.

Figure 15:
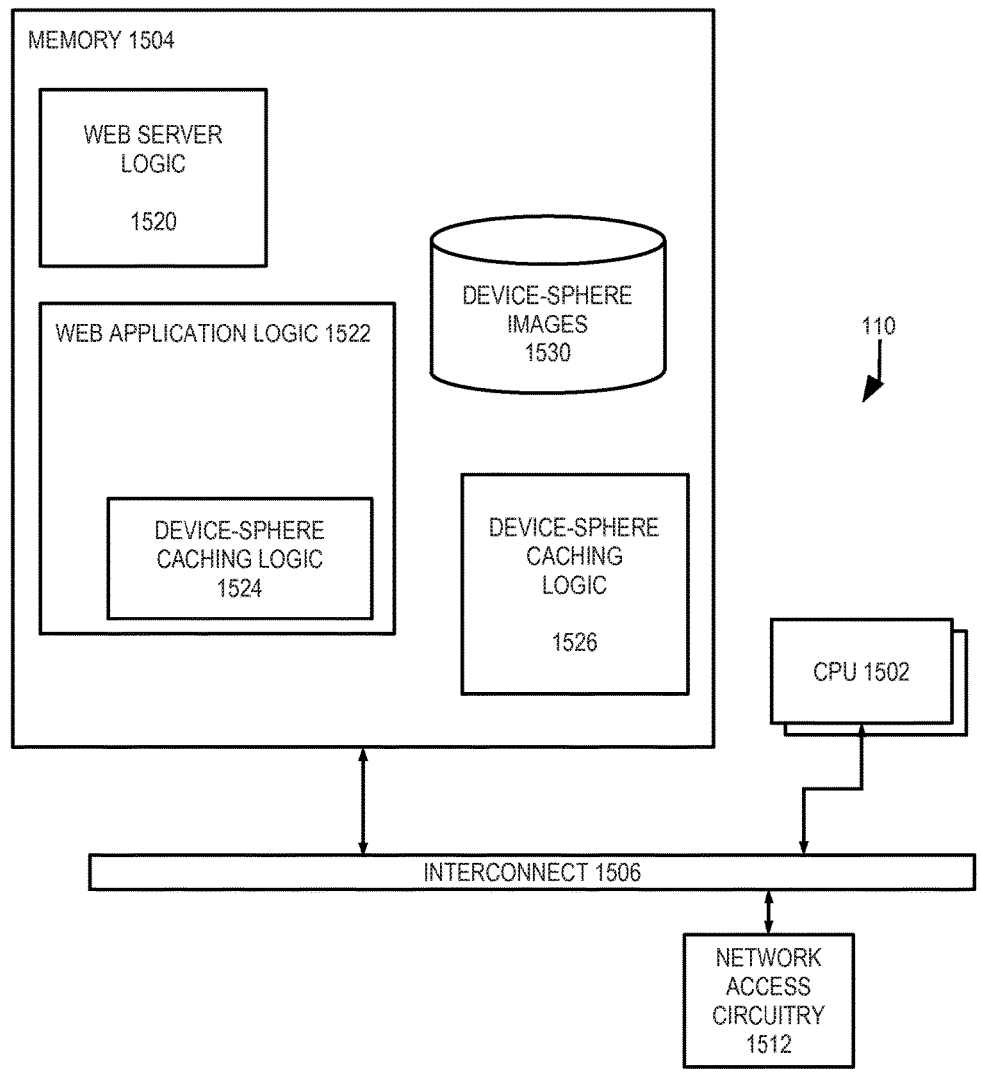
FIG. 15 is a block diagram of the device-sphere manager of FIG. 1 in greater detail.

Device-sphere manager 110 is shown in greater detail in FIG. 15. Device-sphere manager 110 includes one or more microprocessors 1502 (collectively referred to as CPU 1502) that retrieve data and/or instructions from memory 1504 and execute retrieved instructions in a conventional manner. Memory 1504 can include generally any computer-readable medium including, for example, persistent memory such as magnetic and/or optical disks, ROM, and PROM and volatile memory such as RAM.

CPU 1502 and memory 1504 are connected to one another through a conventional interconnect 1506, which is a bus in this illustrative embodiment and which connects CPU 1502 and memory 1504 to network access circuitry 1512. Network access circuitry 1512 sends and receives data through computer networks such as LAN 104 (FIG. 1).

Since device-sphere manager 110 is a server computer, input and output devices are not needed in this illustrative embodiment. However, device-sphere manager 110 can include input and output devices analogous to input devices 1308 (FIG. 13) and output devices 1310, respectively.

A number of components of device-sphere manager 110 (FIG. 15) are stored in memory 1504. In particular, web server logic 1520 and web application logic 1522, including device-sphere caching logic 1524, are all or part of one or more computer processes executing within CPU 1502 from memory 1504 in this illustrative embodiment but can also be implemented using digital logic circuitry.

Web server logic 1520 is a conventional web server. Web application logic 1522 is content that defines one or more pages of a web site and is served by web server logic 1520 to client devices such as device 102A. Device-sphere caching logic 1524 is a part of web application logic 1522 that maintains device images 204 (FIG. 2), data image 206, and desktop image 208 in the manner described herein. Maintenance of device images 204, data image 206, and desktop image 208 in the manner described herein can also be performed in whole or in part by device-sphere caching logic 1526 (FIG. 15), which is software installed in device-sphere manager 110 independently of web server logic 1520 and web application logic 1522.

Device-sphere images 1530 is data stored persistently in memory 1504 (FIG. 15) and stores device-sphere records such as device-sphere record 200 (FIG. 2). Device-sphere images 1530 can be organized as all or part of one or more databases.

Figure 16:
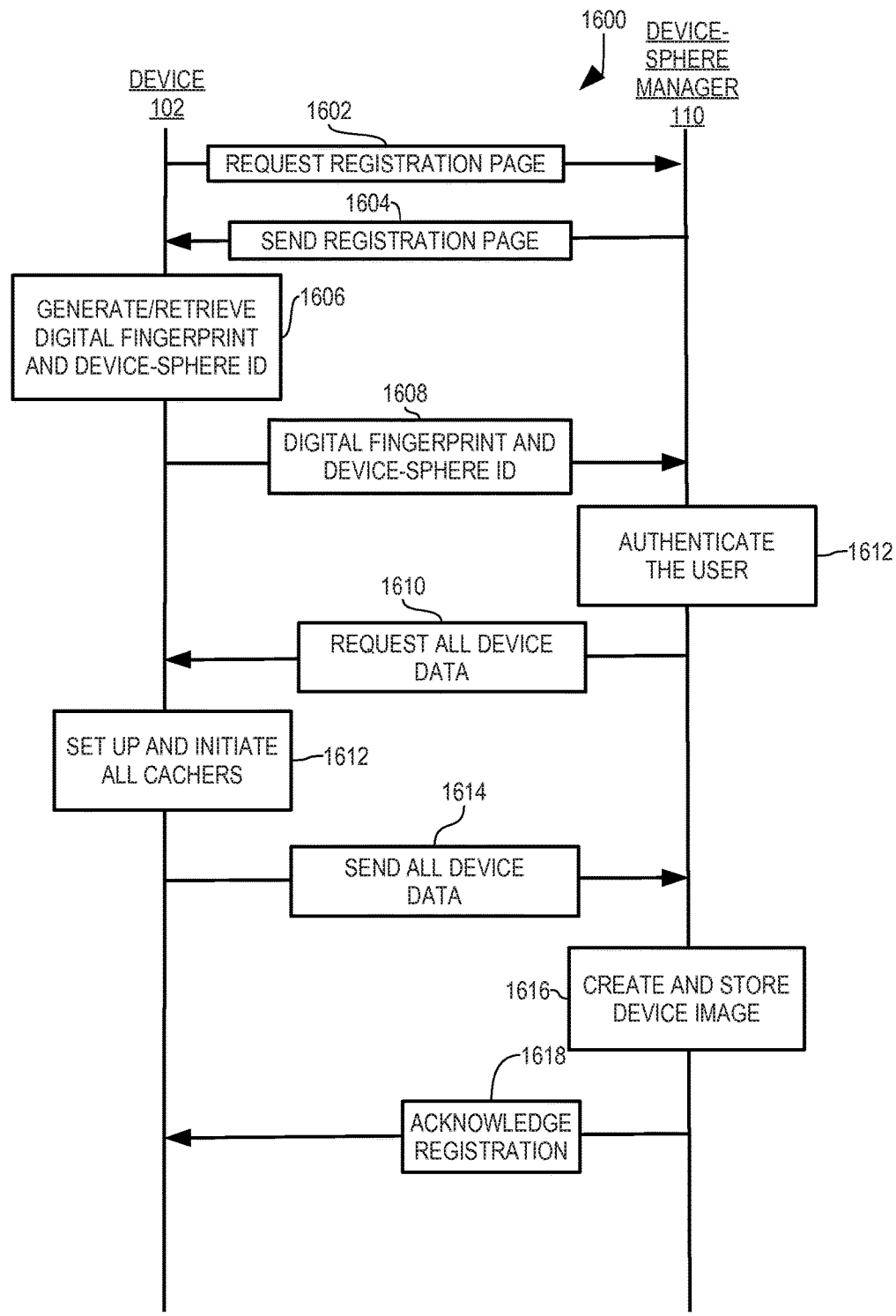
FIG. 16 is a transaction flow diagram illustrating one embodiment according to the invention of a method in which a new device is registered with device-sphere manager.

When the user first acquires a new device, the device is initially unknown to device-sphere manager 110 and is therefore not represented in device-sphere record 200. The manner in which a new device is registered with device-sphere manager 110 is illustrated by transaction flow diagram 1600 (FIG. 16).

In step 1602, the new device requests a registration page from device-sphere manager 110. In response to the request, device-sphere manager 110 sends a registration page to the new device in step 1604.

The registration page includes logic that causes the new device to generate a digital fingerprint of the new device and to determine a device-sphere identifier in step 1606. In this illustrative embodiment, the device-sphere identifier is an e-mail address of the user. In addition to the device-sphere identifier, the new device gathers authentication data of the user, e.g., by prompting the user to enter a password using a conventional user interface involving physical manipulation of one or more of input devices 1308.

In step 1608, the new device sends the digital fingerprint, the device-sphere identifier, and the user authentication data to device-sphere manager 110. In response, device-sphere manager 110 authenticates the user as a precondition for allowing the new device to be added to any pre-existing device-sphere. If the identified device-sphere is not one recognized by device-sphere manager 110, the authentication data and device-sphere identifier are used to create a new device-sphere record for a new-device sphere and will be used to authenticate the user when adding more devices to the newly created device-sphere.

In step 1610, device-sphere manager 110 requests all data of the new device of the types described above with respect to device image 204 (FIG. 2), data image 206, and desktop image 208. In response thereto, the new device sets up and initiates all cachers described above with respect to FIG. 14 in step 1612. The request of step 1610 can include cacher logic to be installed in the new device or can cause the new device to acquire cacher logic from device-sphere manager 110 or another server.

Once the cachers are initiated in step 1612, they begin to report changes from an original "nil" state, i.e., the entire state of the new device, to device-sphere manager 110 in the manner described above with respect to transaction flow diagram 600 (FIG. 6) in step 1614 (FIG. 16). Step 1614 can take a very long time and therefore executes in the background (with no user interface).

As device-sphere manager 110 receives the change reports from the new device in step 1614, device-sphere manager 110 creates and effects the changes in a device image of the new device and a data image for the device-sphere. Once all data of the new device has been received in step 1614 and stored in step 1616, device-sphere manager 110 sends acknowledgement of registration to the new device in step 1618.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for improving continuity of a user's experience in a device-sphere of two or more devices under control of the user wherein each of a first device and a second of the two or more devices are different types of devices selected from the group consisting of a desktop or laptop computer, tablet computer, smartphone, digital still camera, digital video camera, smart television, set-top box, gaming console, personal video recorder, digital media player, networked music player and network-attached storage device, the method comprising:

authenticating, at a device state manager, the two or more devices;

receiving, at the device-state manager, state report data from the first device, wherein the state report data reports a state of the first device and is received in a real-time incremental manner;

automatically and without user intervention maintaining, by the device-state manager, a first device image corresponding to the first device, including using the state report data to accurately represent the state of the first device in the first device image;

maintaining by the device-state manager a data image representing device-sphere data that is shared by the two or more devices of the device-sphere, including using the state report data to accurately represent a state of the device-sphere data;

receiving, by the device state manager, a request from the second device of the two or more devices of the device-sphere for device-specific state change data, wherein said device-specific state change data is determined at least in part on the request and differences between a specific hardware configuration of said second device and the first device;

sending from the device-state manager, said device-specific state change data, which corresponds to the state report data, to said second device in a real-time incremental manner that causes the other second device to effect a change in its state in a manner represented by the device-specific state change data;

where the device-state manager is an executable process resident in a remote server computer located outside of each local area network of each device-sphere device, which process is accessible by each of the device-sphere devices via at least one wide-area network communication protocol.

2. The method of claim 1 wherein the first device image includes one or more partition images of one or more respective persistent storage partitions of the first device.

3. The method of claim 1 wherein the first device image includes a desktop image that represents a state of a graphical user interface desktop of the first device.

4. The method of claim 1 wherein the first device image includes application data representing each of one or more applications installed in the first device.

5. The method of claim 4 wherein the application data includes settings data representing user-selected preferences of the application, extras data representing components of the application installed in the first device, and substantive data representing data maintained by the application.

6. A non-transitory computer readable medium useful in association with a first device which includes one or more processors and a memory, the computer readable medium including computer instructions which are configured to cause the first device, by execution of the computer instructions in the one or more processors from the memory, to improve continuity of a user's experience in a device-sphere of two or more devices under control of the user wherein each of a first device and a second of the two or more devices are different types of devices selected from the group consisting of a desktop or laptop computer, tablet computer, smartphone, digital still camera, digital video camera, smart television, set-top box, gaming console, personal video recorder, digital media player, networked music player and network-attached storage device by at least:
  authenticating, at a device state manager, the two or more devices;
  receiving, at the device-state manager, state report data from the first device, wherein the state report data reports a state of the first device and is received in a real-time incremental manner;
  automatically and without user intervention maintaining, by the device-state manager, a first device image corresponding to the first device, including using the state report data to accurately represent the state of the first device in the first device image;
  maintaining by the device-state manager a data image representing device-sphere data that is shared by the two or more devices of the device-sphere, including using the state report data to accurately represent a state of the device-sphere data;
  receiving, by the device state manager, a request from the second device of the two or more devices of the device-sphere for device-specific state change data, wherein said device-specific state change data is determined at least in part on the request and differences between a specific hardware configuration of said second device and the first device;
  sending from the device-state manager, said device-specific state change data, which corresponds to the state report data, to said second device in a real-time incremental manner that causes the other second device to effect a change in its state in a manner represented by the device-specific state change data.

7. The computer readable medium of claim 6 wherein the first device image includes one or more partition images of one or more respective persistent storage partitions of the first device.

8. The computer readable medium of claim 6 wherein the first device image includes a desktop image that represents a state of a graphical user interface desktop of the first device.

9. The computer readable medium of claim 6 wherein the first device image includes application data representing each of one or more applications installed in the first device.

10. The computer readable medium of claim 9 wherein the application data includes settings data representing user-selected preferences of the application, extras data representing components of the application installed in the first device, and substantive data representing data maintained by the application.

11. A computer system comprising:
  at least one processor;
  a computer readable medium that is operatively coupled to the processor;
  network access circuitry that is operatively coupled to the processor; and
  device-sphere management logic (i) that executes at least in part in the processor from the computer readable medium and (ii) that, when executed, causes a first device to improve continuity of a user's experience in a device-sphere of two two or more devices under control of the user wherein each of a first device and a second of the two or more devices are different types of devices selected from the group consisting of a desktop or laptop computer, tablet computer, smartphone, digital still camera, digital video camera, smart television, set-top box, gaming console, personal video recorder, digital media player, networked music player and network-attached storage device by at least:
  authenticating, at a device state manager, the two or more devices;
  receiving, at the device-state manager, state report data from the first device, wherein the state report data reports a state of the first device and is received in a real-time incremental manner;
  automatically and without user intervention maintaining, by the device-state manager, a first device image corresponding to the first device, including using the state report data to accurately represent the state of the first device in the first device image;
  maintaining by the device-state manager a data image representing device-sphere data that is shared by the two or more devices of the device-sphere, including using the state report data to accurately represent a state of the device-sphere data;
  receiving, by the device state manager, a request from the second device of the two or more devices of the device-sphere for device-specific state change data, wherein said device-specific state change data is determined at least in part on the request and differences between a specific hardware configuration of said second device and the first device;
  sending from the device-state manager, said device-specific state change data, which corresponds to the state report data, to said second device in a real-time incremental manner that causes the other second device to effect a change in its state in a manner represented by the device-specific state change data;
  where the device-state manager is an executable process resident in a remote server computer located outside of each local area network of each device-sphere device, which process is accessible by each of the device-sphere devices via at least one wide-area network communication protocol.

12. The computer system of claim 11 wherein the first device image includes one or more partition images of one or more respective persistent storage partitions of the first device.

13. The computer system of claim 11 wherein the first device image includes a desktop image that represents a state of a graphical user interface desktop of the first device.

14. The computer system of claim 11 wherein the first device image includes application data representing each of one or more applications installed in the first device.

15. The computer system of claim 14 wherein the application data includes settings data representing user-selected preferences of the application, extras data representing components of the application installed in the first device, and substantive data representing data maintained by the application.

* * * * *